(12) United States Patent
Fritzler et al.

(10) Patent No.: US 11,227,739 B2
(45) Date of Patent: Jan. 18, 2022

(54) X-RAY ANODE, X-RAY EMITTER AND METHOD FOR PRODUCING AN X-RAY ANODE

(71) Applicant: Siemens Healthcare GmbH, Erlangen (DE)

(72) Inventors: Anja Fritzler, Erlangen (DE); Peter Geithner, Erlangen (DE); Petra Maurer, Heroldsbach (DE); Thomas Weber, Hausen (DE); Brigitte Streller, Memmelsdorf (DE)

(73) Assignee: SIEMENS HEALTHCARE GMBH, Erlangen (DE)

( * ) Notice: Subject to any disclaimer, the term of this patent is extended or adjusted under 35 U.S.C. 154(b) by 135 days.

(21) Appl. No.: 16/574,719

(22) Filed: Sep. 18, 2019

(65) Prior Publication Data

US 2020/0098538 A1    Mar. 26, 2020

(30) Foreign Application Priority Data

Sep. 26, 2018 (EP) .................................. 18196848

(51) Int. Cl.
*H01J 35/10*    (2006.01)
*H01J 35/08*    (2006.01)

(52) U.S. Cl.
CPC .................... *H01J 35/112* (2019.05)

(58) Field of Classification Search
CPC .... H01J 2235/086; H01J 35/08; H01J 35/112; H01J 35/305; H01J 35/10; H01J 2235/081; H01J 2235/084; H01J 2235/085; H01J 35/105; H01J 35/108; H01J 35/14; H01J 35/147; H01J 2235/088; H01J 2235/1204; H01J 2235/1291; H01J 35/12; H01J 35/153; H01J 35/26; H01J 2235/08; H01J 2235/083; H01J 2235/1006; H01J 35/116; H01J 35/18; H01J 35/186; H01J 35/06; H01J 35/066; H01J 35/30; H01J 1/16;

(Continued)

(56) References Cited

U.S. PATENT DOCUMENTS 4,837,793 A * 6/1989 Frankel ............... G03F 7/70033
378/34
4,991,194 A * 2/1991 Laurent ................... H01J 35/10
378/124

(Continued)

FOREIGN PATENT DOCUMENTS

CN        101465260 A       6/2009
DE        4222225 A1        1/1994
(Continued)

OTHER PUBLICATIONS

Extended European Search Report dated Oct. 15, 2020.
NPL: Extended European Search report for EP 18196848, dated Mar. 1, 2019 and English translation herewith.

*Primary Examiner* — Irakli Kiknadze
(74) *Attorney, Agent, or Firm* — Harness, Dickey & Pierce, P.L.C.

(57) ABSTRACT

An x-ray anode for an x-ray emitter has a structured surface provided for impingement with electrons. According to an embodiment of the invention, the structured surface has a surface structure which alternates periodically at least in sections and which varies in the micrometer range with respect to its depth extension and periodicity.

30 Claims, 2 Drawing Sheets

(58) Field of Classification Search
CPC ........ H01J 2235/06; H01J 19/10; H01J 19/42; H01J 1/18; H01J 1/3042; H01J 1/88; H01J 21/105; H01J 2201/30407; H01J 2229/481; H01J 2229/4827; H01J 2229/4831; H01J 2229/50; H01J 2237/24585; H01J 37/26; H01J 2235/163; H01J 35/02; H01J 35/064; H01J 35/106; H01J 35/16; H01J 35/045; H01J 2235/166; H01J 2235/062; H01J 2235/068; H01J 29/08; H01J 31/38; H01J 31/49; H01J 35/065; H01J 2235/082; H01J 2235/106; H01J 2235/1086; H01J 2235/1233; H01J 2235/124; H01J 2235/1245; H01J 2235/1279; H01J 2235/183; H01J 2235/1241; H01J 35/1017; H01J 37/256; H01J 47/06; A61B 6/032; A61B 6/508; A61B 6/583; A61B 6/035; A61B 6/40; A61B 6/4258; A61B 6/44; A61B 6/4488; A61B 6/582; A61B 6/587; A61B 6/507; A61B 6/145; A61B 6/4411; A61B 6/4028; A61B 6/00; A61B 6/429; A61B 6/4441; A61B 6/484; A61B 6/027; A61B 6/4021; A61B 6/501; A61B 17/0049; A61B 17/0057; A61B 17/12118; A61B 17/12181; A61B 17/3468; A61B 18/18; A61B 2017/00411; A61B 2017/0065; A61B 2017/00876; A61B 2017/1205; A61B 18/082; A61B 18/1206; A61B 18/1492; A61B 2018/00214; A61B 2018/00494; A61B 2018/00577; G01N 2223/419; G01N 23/046; G01N 23/085; G01N 23/2076; G01N 23/223; G01N 23/205; G01N 2223/303; G01N 23/20; G01N 2223/204; G01N 2223/206; G01N 23/2273; G01N 2223/108; G01N 23/2255; G01N 21/211; G01N 2223/505; G01N 2021/213; H05G 1/26; H05G 1/66; H05G 1/06; H05G 1/02; H05G 1/58; H05G 1/025; H05G 1/24; H05G 1/30; H05G 1/54; H05G 1/04; G21K 1/06; G21K 2201/061; G21K 2201/064; G21K 1/025; G21K 1/062; G21K 1/08; G21K 2201/062; G21K 5/02; G21K 1/02; G21K 1/087; G21K 1/093; G21K 1/10; G21K 1/14; G21K 5/04; G21K 1/067; G21K 7/00; G21K 2004/06; G21K 4/00; G21K 5/00; A61N 2005/1089; A61N 2005/1091; A61N 2005/1095; A61N 5/1001; A61N 5/1042; A61N 5/1084; A61N 2005/1087; G01B 15/02; G01V 5/0025; H05H 13/04; H05H 7/04; H05H 7/08; H05H 7/10; B01J 19/085; B01J 19/125; B01J 2219/00164; B01J 2219/00198; B01J 2219/00211; B01J 2219/00231; B01J 4/004

USPC .......................... 378/119, 124, 136, 143, 144
See application file for complete search history.

(56) References Cited

U.S. PATENT DOCUMENTS

| | | | |
|---|---|---|---|
| 5,381,456 A | | 1/1995 | Deslattes |
| 5,383,232 A | * | 1/1995 | Gabbay ................... H01J 35/10 378/124 |
| 2004/0099996 A1 | | 5/2004 | Herzog |
| 2004/0208288 A1 | | 10/2004 | Lenz |
| 2011/0211676 A1 | * | 9/2011 | Dorscheid ............. H01J 35/101 378/121 |
| 2019/0324202 A1 | * | 10/2019 | Colburn ............. G02B 27/0172 |

FOREIGN PATENT DOCUMENTS

| | | |
|---|---|---|
| DE | 19614333 A1 | 10/1997 |
| DE | 10360018 A1 | 7/2004 |
| DE | 102009048460 A1 | 5/2011 |
| DE | 102011083413 A1 | 3/2013 |
| JP | H05290772 A | 11/1993 |
| JP | H09161700 A | 6/1997 |
| KR | 20190113429 A | 10/2019 |

\* cited by examiner

X-RAY ANODE, X-RAY EMITTER AND METHOD FOR PRODUCING AN X-RAY ANODE

PRIORITY STATEMENT

The present application hereby claims priority under 35 U.S.C. § 119 to European patent application number EP 18196848.8 filed Sep. 26, 2018, the entire contents of which are hereby incorporated herein by reference.

FIELD

Embodiments of the invention generally relate to an x-ray anode, an x-ray emitter and to a method for producing an x-ray anode.

BACKGROUND

X-ray emitters in different embodiments are known sufficiently from the prior art. There is generally a potential difference between a cathode and an x-ray anode of the x-ray emitter, so that the electrons emitted by the cathode are accelerated in the direction of the x-ray anode. The electrons impinge upon the x-ray anode in the region of the focal point and are in the process slowed down while emitting x-ray radiation, in particular braking radiation. The x-ray anode may be for instance stationary as what is known as a stationary anode with a cathode typically arranged essentially centrally or can be rotated about an axis of rotation. Rotation about the axis of rotation causes the region stressed thermally as a result of impingement with electrons to be effectively enlarged. X-ray emitters of this type therefore have rotary anodes, with which the cathode is typically arranged centrally above the focal track impinged upon by the electrons, or are embodied as rotary piston emitters (also rotary piston tubes).

With the latter design, the x-ray anode is part of a rotably mounted housing, which typically has a narrowing (also: x-ray narrowing). In the case of such rotary piston emitters, the cathode is arranged essentially centrally above the x-ray anode, which is designed to be impinged upon with electrons in an edge-side region. The deflection or focusing of the electrons emitted on the cathode side which is required for this purpose is carried out by means of a magnetic quadrupole, for instance.

On account of this constructive design of rotary piston emitters and the fact that a field-free space exists after the narrowing, the electrons generally strike the surface of the x-ray anode at a flat angle of impact. This results in the backscatter rate being relatively high, so that in particular a laterally arranged exit window for x-ray radiation can be struck by almost unbraked electrons. The electrons striking the exit window produce x-ray radiation there, which, as an extra focal radiation, in particular reduces the image quality of x-ray images produced.

DE 10 2011 083 413 A1 also discloses an x-ray anode with a mesh-type structured region, which is designed to reduce the stresses in the material caused by the in particular cyclical temperature load.

SUMMARY

At least one embodiment of the present invention specifies x-ray emitters with improved radiation characteristics.

With respect to embodiments of the apparatus, the embodiments are achieved by an x-ray anode or an x-ray emitter.

With respect to embodiments of the method, the embodiments are achieved by a method for producing an x-ray anode.

Advantageous embodiments of the invention form the subject matter of the claims.

In at least one embodiment, an x-ray anode for an x-ray emitter has a structured surface provided for impingement with electrons. According to at least one embodiment of the invention, the structured surface has a surface structure which alternates periodically at least in sections and which varies in the micrometer range with respect to its depth extension and periodicity.

An x-ray emitter according to an embodiment of the invention has one of the x-ray anodes described above with a structured surface. The associated advantages will be apparent directly from the previous description with reference to the structured x-ray anode. In particular, an x-ray emitter embodied in this way has a radiation characteristic with reduced extra focal radiation. This increases in particular the image quality of acquired x-ray images. Moreover, the beam exposition of a person, in particular a patient, can be reduced in medical applications. Since the surface structuring of the x-ray anode further brings about a higher photon yield, it is also possible to move to lower powers with essentially the same amount of emitted x-ray intensity. This results in a reduction in the thermal load, so that the service life of the x-ray emitter is increased.

An x-ray anode for an x-ray emitter according to an embodiment of the invention, including a structured surface provided for impingement with electrons, the structured surface including a surface structure periodically alternating at least in sections, varying in respect of to a depth extension, wherein a varying depth extension and periodicity of the periodically alternating surface structure is less than 40 μm and wherein at least one of the variation of the depth extension and the periodicity is in a range of an average free electron path length in a material of the x-ray anode.

A method according to an embodiment of the invention comprises:

using an x-ray emitter to generate x-ray images, the x-ray emitter including an x-ray anode, including a structured surface provided for impingement with electrons, the structured surface including a surface structure periodically alternating at least in sections, varying in respect of to a depth extension, wherein a varying depth extension and periodicity of the periodically alternating surface structure is less than 40 μm and wherein at least one of the variation of the depth extension and the periodicity is in a range of an average free electron path length in a material of the x-ray anode.

A method according to an embodiment of the invention, for producing an x-ray anode including a structured surface provided for impingement with electrons, the structured surface including a surface structure periodically alternating at least in sections, varying in respect of to a depth extension, wherein a varying depth extension and periodicity of the periodically alternating surface structure is less than 40 μm and wherein at least one of the variation of the depth extension and the periodicity is in a range of an average free electron path length in a material of the x-ray anode, comprises:

introducing the alternating surface structure into the material of the x-ray anode by via of an ablation method or via an additive manufacturing method.

BRIEF DESCRIPTION OF THE DRAWINGS

For a further description of the invention, reference is made to the example embodiment shown in the figures of the drawings. These show schematic representations, as follows.

Figure 1:
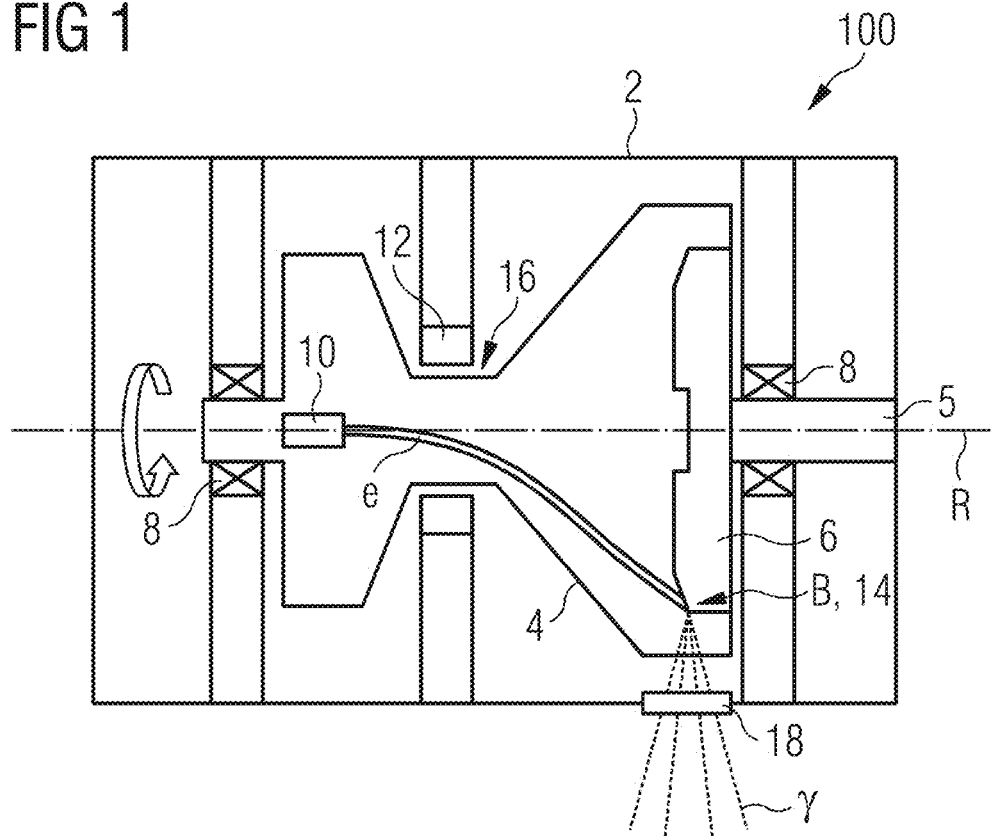
FIG. 1 the schematic design of a rotary piston emitter in a sectional representation, FIG. 2 a representation of the rotary piston emitter cross-sectionally and not true to scale.

Parts which correspond to one another are provided with the same reference signs in all the figures.

DETAILED DESCRIPTION OF THE EXAMPLE EMBODIMENTS

The drawings are to be regarded as being schematic representations and elements illustrated in the drawings are not necessarily shown to scale. Rather, the various elements are represented such that their function and general purpose become apparent to a person skilled in the art. Any connection or coupling between functional blocks, devices, components, or other physical or functional units shown in the drawings or described herein may also be implemented by an indirect connection or coupling. A coupling between components may also be established over a wireless connection. Functional blocks may be implemented in hardware, firmware, software, or a combination thereof.

Various example embodiments will now be described more fully with reference to the accompanying drawings in which only some example embodiments are shown. Specific structural and functional details disclosed herein are merely representative for purposes of describing example embodiments. Example embodiments, however, may be embodied in various different forms, and should not be construed as being limited to only the illustrated embodiments. Rather, the illustrated embodiments are provided as examples so that this disclosure will be thorough and complete, and will fully convey the concepts of this disclosure to those skilled in the art. Accordingly, known processes, elements, and techniques, may not be described with respect to some example embodiments. Unless otherwise noted, like reference characters denote like elements throughout the attached drawings and written description, and thus descriptions will not be repeated. The present invention, however, may be embodied in many alternate forms and should not be construed as limited to only the example embodiments set forth herein.

It will be understood that, although the terms first, second, etc. may be used herein to describe various elements, components, regions, layers, and/or sections, these elements, components, regions, layers, and/or sections, should not be limited by these terms. These terms are only used to distinguish one element from another. For example, a first element could be termed a second element, and, similarly, a second element could be termed a first element, without departing from the scope of example embodiments of the present invention. As used herein, the term "and/or," includes any and all combinations of one or more of the associated listed items. The phrase "at least one of" has the same meaning as "and/or".

Spatially relative terms, such as "beneath," "below," "lower," "under," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below," "beneath," or "under," other elements or features would then be oriented "above" the other elements or features. Thus, the example terms "below" and "under" may encompass both an orientation of above and below. The device may be otherwise oriented (rotated 90 degrees or at other orientations) and the spatially relative descriptors used herein interpreted accordingly. In addition, when an element is referred to as being "between" two elements, the element may be the only element between the two elements, or one or more other intervening elements may be present.

Spatial and functional relationships between elements (for example, between modules) are described using various terms, including "connected," "engaged," "interfaced," and "coupled." Unless explicitly described as being "direct," when a relationship between first and second elements is described in the above disclosure, that relationship encompasses a direct relationship where no other intervening elements are present between the first and second elements, and also an indirect relationship where one or more intervening elements are present (either spatially or functionally) between the first and second elements. In contrast, when an element is referred to as being "directly" connected, engaged, interfaced, or coupled to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting of example embodiments of the invention. As used herein, the singular forms "a," "an," and "the," are intended to include the plural forms as well, unless the context clearly indicates otherwise. As used herein, the terms "and/or" and "at least one of" include any and all combinations of one or more of the associated listed items. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Also, the term "example" is intended to refer to an example or illustration.

When an element is referred to as being "on," "connected to," "coupled to," or "adjacent to," another element, the element may be directly on, connected to, coupled to, or adjacent to, the other element, or one or more other intervening elements may be present. In contrast, when an element is referred to as being "directly on," "directly connected to," "directly coupled to," or "immediately adjacent to," another element there are no intervening elements present.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Before discussing example embodiments in more detail, it is noted that some example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order. Although the flowcharts describe the operations as sequential processes, many of the operations may be performed in parallel, concurrently or simultaneously. In addition, the order of operations may be re-arranged. The processes may be terminated when their operations are completed, but may also have additional steps not included in the figure. The processes may correspond to methods, functions, procedures, subroutines, subprograms, etc.

Specific structural and functional details disclosed herein are merely representative for purposes of describing example embodiments of the present invention. This invention may, however, be embodied in many alternate forms and should not be construed as limited to only the embodiments set forth herein.

Units and/or devices according to one or more example embodiments may be implemented using hardware, software, and/or a combination thereof. For example, hardware devices may be implemented using processing circuitry such as, but not limited to, a processor, Central Processing Unit (CPU), a controller, an arithmetic logic unit (ALU), a digital signal processor, a microcomputer, a field programmable gate array (FPGA), a System-on-Chip (SoC), a programmable logic unit, a microprocessor, or any other device capable of responding to and executing instructions in a defined manner. Portions of the example embodiments and corresponding detailed description may be presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" of "displaying" or the like, refer to the action and processes of a computer system, or similar electronic computing device/hardware, that manipulates and transforms data represented as physical, electronic quantities within the computer system's registers and memories into other data similarly represented as physical quantities within the computer system memories or registers or other such information storage, transmission or display devices.

In this application, including the definitions below, the term 'module' or the term 'controller' may be replaced with the term 'circuit.' The term 'module' may refer to, be part of, or include processor hardware (shared, dedicated, or group) that executes code and memory hardware (shared, dedicated, or group) that stores code executed by the processor hardware.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

Software may include a computer program, program code, instructions, or some combination thereof, for independently or collectively instructing or configuring a hardware device to operate as desired. The computer program and/or program code may include program or computer-readable instructions, software components, software modules, data files, data structures, and/or the like, capable of being implemented by one or more hardware devices, such as one or more of the hardware devices mentioned above. Examples of program code include both machine code produced by a compiler and higher level program code that is executed using an interpreter.

For example, when a hardware device is a computer processing device (e.g., a processor, Central Processing Unit (CPU), a controller, an arithmetic logic unit (ALU), a digital signal processor, a microcomputer, a microprocessor, etc.), the computer processing device may be configured to carry out program code by performing arithmetical, logical, and input/output operations, according to the program code. Once the program code is loaded into a computer processing device, the computer processing device may be programmed to perform the program code, thereby transforming the computer processing device into a special purpose computer processing device. In a more specific example, when the program code is loaded into a processor, the processor becomes programmed to perform the program code and operations corresponding thereto, thereby transforming the processor into a special purpose processor.

Software and/or data may be embodied permanently or temporarily in any type of machine, component, physical or virtual equipment, or computer storage medium or device, capable of providing instructions or data to, or being interpreted by, a hardware device. The software also may be distributed over network coupled computer systems so that the software is stored and executed in a distributed fashion.

In particular, for example, software and data may be stored by one or more computer readable recording mediums, including the tangible or non-transitory computer-readable storage media discussed herein.

Even further, any of the disclosed methods may be embodied in the form of a program or software. The program or software may be stored on a non-transitory computer readable medium and is adapted to perform any one of the aforementioned methods when run on a computer device (a device including a processor). Thus, the non-transitory, tangible computer readable medium, is adapted to store information and is adapted to interact with a data processing facility or computer device to execute the program of any of the above mentioned embodiments and/or to perform the method of any of the above mentioned embodiments.

Example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order.

According to one or more example embodiments, computer processing devices may be described as including various functional units that perform various operations and/or functions to increase the clarity of the description. However, computer processing devices are not intended to be limited to these functional units. For example, in one or more example embodiments, the various operations and/or functions of the functional units may be performed by other ones of the functional units. Further, the computer processing devices may perform the operations and/or functions of the various functional units without sub-dividing the operations and/or functions of the computer processing units into these various functional units.

Units and/or devices according to one or more example embodiments may also include one or more storage devices. The one or more storage devices may be tangible or non-transitory computer-readable storage media, such as random access memory (RAM), read only memory (ROM), a permanent mass storage device (such as a disk drive), solid state (e.g., NAND flash) device, and/or any other like data storage mechanism capable of storing and recording data. The one or more storage devices may be configured to store computer programs, program code, instructions, or some combination thereof, for one or more operating systems and/or for implementing the example embodiments described herein. The computer programs, program code, instructions, or some combination thereof, may also be loaded from a separate computer readable storage medium into the one or more storage devices and/or one or more computer processing devices using a drive mechanism. Such separate computer readable storage medium may include a Universal Serial Bus (USB) flash drive, a memory stick, a Blu-ray/DVD/CD-ROM drive, a memory card, and/or other like computer readable storage media. The computer programs, program code, instructions, or some combination thereof, may be loaded into the one or more storage devices and/or the one or more computer processing devices from a remote data storage device via a network interface, rather than via a local computer readable storage medium. Additionally, the computer programs, program code, instructions, or some combination thereof, may be loaded into the one or more storage devices and/or the one or more processors from a remote computing system that is configured to transfer and/or distribute the computer programs, program code, instructions, or some combination thereof, over a network. The remote computing system may transfer and/or distribute the computer programs, program code, instructions, or some combination thereof, via a wired interface, an air interface, and/or any other like medium.

The one or more hardware devices, the one or more storage devices, and/or the computer programs, program code, instructions, or some combination thereof, may be specially designed and constructed for the purposes of the example embodiments, or they may be known devices that are altered and/or modified for the purposes of example embodiments.

A hardware device, such as a computer processing device, may run an operating system (OS) and one or more software applications that run on the OS. The computer processing device also may access, store, manipulate, process, and create data in response to execution of the software. For simplicity, one or more example embodiments may be exemplified as a computer processing device or processor; however, one skilled in the art will appreciate that a hardware device may include multiple processing elements or processors and multiple types of processing elements or processors. For example, a hardware device may include multiple processors or a processor and a controller. In addition, other processing configurations are possible, such as parallel processors.

The computer programs include processor-executable instructions that are stored on at least one non-transitory computer-readable medium (memory). The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc. As such, the one or more processors may be configured to execute the processor executable instructions.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C #, Objective-C, Haskell, Go, SQL, R, Lisp, Java®, Fortran, Perl, Pascal, Curl, OCaml, Javascript®, HTML5, Ada, ASP (active server pages), PHP, Scala, Eiffel, Smalltalk, Erlang, Ruby, Flash®, Visual Basic®, Lua, and Python®.

Further, at least one embodiment of the invention relates to the non-transitory computer-readable storage medium including electronically readable control information (procesor executable instructions) stored thereon, configured in such that when the storage medium is used in a controller of a device, at least one embodiment of the method may be carried out.

The computer readable medium or storage medium may be a built-in medium installed inside a computer device main body or a removable medium arranged so that it can be separated from the computer device main body. The term computer-readable medium, as used herein, does not encompass transitory electrical or electromagnetic signals propagating through a medium (such as on a carrier wave); the term computer-readable medium is therefore considered tangible and non-transitory. Non-limiting examples of the non-transitory computer-readable medium include, but are not limited to, rewriteable non-volatile memory devices (including, for example flash memory devices, erasable programmable read-only memory devices, or a mask read-only memory devices); volatile memory devices (including, for example static random access memory devices or a dynamic random access memory devices); magnetic storage media (including, for example an analog or digital magnetic tape or a hard disk drive); and optical storage media (including, for example a CD, a DVD, or a Blu-ray Disc). Examples of the media with a built-in rewriteable non-volatile memory, include but are not limited to memory cards; and media with a built-in ROM, including but not limited to ROM cassettes; etc. Furthermore, various information regarding stored images, for example, property information, may be stored in any other form, or it may be provided in other ways.

The term code, as used above, may include software, firmware, and/or microcode, and may refer to programs, routines, functions, classes, data structures, and/or objects. Shared processor hardware encompasses a single microprocessor that executes some or all code from multiple modules. Group processor hardware encompasses a microprocessor that, in combination with additional microprocessors, executes some or all code from one or more modules. References to multiple microprocessors encompass multiple microprocessors on discrete dies, multiple microprocessors on a single die, multiple cores of a single microprocessor, multiple threads of a single microprocessor, or a combination of the above.

Shared memory hardware encompasses a single memory device that stores some or all code from multiple modules. Group memory hardware encompasses a memory device that, in combination with other memory devices, stores some or all code from one or more modules.

The term memory hardware is a subset of the term computer-readable medium. The term computer-readable medium, as used herein, does not encompass transitory electrical or electromagnetic signals propagating through a medium (such as on a carrier wave); the term computer-readable medium is therefore considered tangible and non-transitory. Non-limiting examples of the non-transitory computer-readable medium include, but are not limited to, rewriteable non-volatile memory devices (including, for example flash memory devices, erasable programmable read-only memory devices, or a mask read-only memory devices); volatile memory devices (including, for example static random access memory devices or a dynamic random access memory devices); magnetic storage media (including, for example an analog or digital magnetic tape or a hard disk drive); and optical storage media (including, for example a CD, a DVD, or a Blu-ray Disc). Examples of the media with a built-in rewriteable non-volatile memory, include but are not limited to memory cards; and media with a built-in ROM, including but not limited to ROM cassettes; etc. Furthermore, various information regarding stored images, for example, property information, may be stored in any other form, or it may be provided in other ways.

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

Although described with reference to specific examples and drawings, modifications, additions and substitutions of example embodiments may be variously made according to the description by those of ordinary skill in the art. For example, the described techniques may be performed in an order different with that of the methods described, and/or components such as the described system, architecture, devices, circuit, and the like, may be connected or combined to be different from the above-described methods, or results may be appropriately achieved by other components or equivalents.

In at least one embodiment, an x-ray anode for an x-ray emitter has a structured surface provided for impingement with electrons. According to at least one embodiment of the invention, the structured surface has a surface structure which alternates periodically at least in sections and which varies in the micrometer range with respect to its depth extension and periodicity.

The wording that the surface structure varies in the micrometer range with respect to its depth extension and periodicity should in particular be understood to mean that the depth extension and the periodicity is a few micrometers, preferably less than 40 µm, particularly preferably less than 25 µm.

The wording that the structured surface has a surface structure which alternates periodically at least in sections should in particular be understood to mean that this has a cross-sectional profile which alternates periodically. With x-ray anodes embodied in a plate shape (also: anode plates), the cross-sectional profile which alternates periodically can extend in particular in the radial direction.

It has become evident that the surface structuring affects both the angle of impact of the electrons, and thus also the backscatter rate of the electrons, and also the impact location of the electrons. Simulation results particularly with rotary piston emitters indicate that suitable surface structurings in preferred embodiments can bring about a reduction in the extra focal radiation of up to 75% compared with conventional x-ray anodes with smooth surfaces.

It has been ascertained that an increased photon flux could moreover be generated with structured surfaces of this type. The increase in the photon flux is approximately 20%, in particularly preferred embodiments up to 35% compared with conventional x-ray anodes with smooth surfaces. More power is deposited in the focal point or in the focal track, wherein in principle somewhat higher temperatures are also reached there with the same load. The significant increase in power with respect to the photon flux does not however involve an additional load on the x-ray emitter and can advantageously in particular be used to significantly increase the service life of the components used.

Alternatively or in addition, a switch to higher radiation intensities can be made in order to enable improved and more versatile imaging. It should be emphasized in this context that an increase in the photon yield, i.e. the number of photons which can be used in particular for medical imaging, previously necessitated an increase in the x-ray power. The problem here is that the thermal load increases accordingly. This means that the thermal load limit has already been met with many of today's commercially available x-ray emitters. In other words, the present invention also enables the design of x-ray emitters with significantly increased efficiency or the use of lower power high voltage generators without having to accept corresponding losses in the emitted photon intensity of the x-ray emitter.

The increase in the photon yield is dependent on the angle of impact, in which the electrons strike the anode surface in the region of a focal point of a stationary anode, for instance, or, in particular with rotary anodes or rotary piston emitters, of a focal track. Since the direction of incidence of the electrons on the anode surface is essentially determined by the type of construction, the increase in the photon yield is also different depending on the type of construction. It has become evident, in particular, that with an angle of impact of the electrons of approximately 20°, an increase in the photon yield of approximately 30% is to be expected. With a conventional design of the x-ray emitter with a smooth anode surface, the power of the high voltage generator must be increased accordingly by 20%, for instance from 100 kW to 120 kW, in order to achieve the same photon yield. This would result in a corresponding increase in the thermal load.

Provision is made in embodiments for the variation in the depth extension and/or periodicity of the surface structure which alternates periodically to be in the range of the average free electron path length. The wording that the depth extension and periodicity are in the range of the average free electron path length is in particular to be understood to mean that the depth extension and periodicity are in the same order of magnitude as the range of the average free electron path length in the material of the x-ray anode. The free electron path length is in particular dependent on the kinetic energy of the electrons. The specific design of the structured surfaces of the x-ray anode is therefore different for x-ray emitters with different voltages. If the depth extension and periodicity of the surface structure which alternates periodically be in particular in the respective range of the average free electron path length, then a broader power range can be covered.

In order to realize a surface structuring which varies with respect to its depth extension and/or periodicity, the structured surface can have correspondingly dimensioned needle-type structures, for instance.

Provision is made in embodiments for the alternating surface structure to comprise channels which run parallel to one another at least in sections. The surface structure is periodic in particular only with respect to an extension direction. The channels which run parallel to one another at least in sections extend in particular in a non-radial direction, but are embodied to be continuous, for instance, and in embodiments have a constant or varying depth extension. The depth extension of the channels can vary in different embodiments, in particular periodically. The last embodiment is particularly advantageous with respect to minimizing thermal stress.

In various example embodiments, the x-ray anode has a circumferential, for instance rotationally symmetrical form. The channels run in particular obliquely with respect to a radial direction, which is determined by the circumferential or rotationally symmetrical form of the x-ray anode.

Provision is made in embodiments for the alternating surface structure to comprise circumferential, circular channels. Embodiments of this type can be provided in all current anode types, in other words in particular in stationary anodes, rotary anodes or rotary piston emitters.

Provision is made in embodiments for the circumferential, circular channels to be arranged concentrically with respect to one another. The x-ray anode is embodied in the shape of a plate, for instance, so that the center of the circumferential, circular channels can coincide in particular with the center of the x-ray anode embodied in the shape of a plate. Plate-shaped x-ray anodes of this type are embodied as rotary anodes, for instance, or provided as part of a rotary piston emitter with a rotating vacuum housing.

Provision is made in embodiments for the ratio of depth extension and periodicity of the alternating surface structure to be essentially 1:1. In specific embodiments, the surface structure varies in respect of its depth extension in the range of up to 40 μm, preferably in the range of 10 μm to 30 μm, in particular in the range of 10 μm to 20 μm. In embodiments, the variation in the depth extension is in particular approximately 15 μm. The variation in the periodicity (also: period length) of the alternating surface structure is likewise in the range of up to 40 μm, preferably in the range of 10 μm to 30 μm, particularly preferably in the range of 10 to 20 μm, particularly approximately 15 μm.

With x-ray anodes for mammography and other applications, it may be assumed that an optimally adjusted, maximum depth extension of the alternating surface structure or the channel depth is below 10 μm.

Provision is preferably made for the maximum variation in the depth extension to be selected as a function of the kV class of the x-ray emitter. X-ray anodes for medical radiation therapy therefore have a surface structuring with a different depth variation, like e.g. x-ray anodes for mammography.

The cross-sectional profile of the alternating surface structure has an extension which is in the range of the average free path length of the electrons and the absorption length of the emitted photons and may per se have more or less any design. For instance, the alternating surface structure comprises a honeycomb structure with steep walls, which are introduced into the material of the x-ray anode by means of laser ablation in particular.

Provision is made in embodiments for the alternating surface structure to have an essentially sinusoidal profile in cross-section, essentially a rectangular profile or essentially a sawtooth profile. The production of such structures is simplified if they can be generated using laser ablation.

Provision is made in embodiments for the depth extension and/or periodicity of the alternating surface structure to be less than 40 μm, preferably less than 30 μm, particularly preferably less than 20 μm, in particular approximately 15 μm.

Provision is made in embodiments for the alternating surface structure to be introduced into the material of the x-ray anode by means of local material removal, in particular by means of an ablation method, for instance by means of laser ablation or electron beam ablation. With ablation methods of this type, a high energy beam is generally directed at the surface of the component to be structured and material is removed selectively. Methods of this type are suited to generating structurings in the micrometer range with high precision. Here, uneven, curved and/or tapered surfaces in particular can be structured quickly, precisely and cost-effectively. Microstructure machining, for instance micromilling, micro die sinking and etching methods with previous covering or masking of the focal path can be considered as suitable mechanical and/or chemical ablation methods.

Provision is made in embodiments for the alternating surface structure to be produced by means of an additive manufacturing method, in particular by means of selective laser melting, selective laser sintering, selective electron beam melting.

Provision is made in embodiments for the alternating surface structure to be produced by means of fused filament fabrication, gas dynamic cold spraying, screen printing or by means of coating techniques, in particular by means of chemical vapor deposition (CVD) or physical vapor deposition (PVD).

An x-ray emitter according to an embodiment of the invention has one of the x-ray anodes described above with a structured surface. The associated advantages will be apparent directly from the previous description with reference to the structured x-ray anode. In particular, an x-ray emitter embodied in this way has a radiation characteristic with reduced extra focal radiation. This increases in particular the image quality of acquired x-ray images. Moreover, the beam exposition of a person, in particular a patient, can be reduced in medical applications. Since the surface structuring of the x-ray anode further brings about a higher photon yield, it is also possible to move to lower powers with essentially the same amount of emitted x-ray intensity. This results in a reduction in the thermal load, so that the service life of the x-ray emitter is increased.

Provision is made in embodiments for the x-ray anode to be rotatable about an axis of rotation. In other words, the x-ray emitter has a rotary anode or is embodied as a rotary piston emitter, for instance. In alternative embodiments, the x-ray anode is embodied as a stationary anode.

In embodiments, the x-ray emitter has a structural design such that electrons strike the structured surface essentially at an angle of impact of up to 90°, preferably at an angle of impact of less than 60°, particularly preferably less than 50°, in particular at an angle of impact of less than 45°. Such a flat angle of impact of the electrons generally results in a relatively high backscatter rate. This high backscatter rate can be compensated for at least for the most part in that the x-ray anode with the structured surface described above is provided in the region of the focal point or with rotating x-anodes in the region of the focal track. The minimum angle of impact can be approximately 1°, for instance.

The x-ray emitter described above is preferably used to generate x-ray images. The surface structure of the x-ray anode is designed in particular to minimize extra focal radiation which reduces image quality. This can be used advantageously in all imaging methods based on x-ray radiation, particularly in computed tomography, mammography, angiography, fluoroscopy or in material testing.

In embodiments, the x-ray radiation generated is provided for imaging, for instance for medical imaging, for radiation therapy, for material testing or for freight inspection. The x-ray emitter is used for instance in a C-arm x-ray device, a computed tomography system, an x-ray device for mammography or angiography or in another x-ray device for medical imaging.

It has become evident that a flat angle of impact of the electrons combined with a surface-structured x-ray anode results in an increase in the photon yield which is already in the order of magnitude of approx. 35%. However, the spectrum passes through a small prefiltering process with such a flat angle of impact, which is not necessary with a steeper incidence, i.e. with an angle of impact of the electrons which is greater than 60°. With an angle of impact beyond the aforecited 60°, the effective increase in the photon yield can therefore be even higher.

In a method for producing one of the aforecited x-ray anodes, the alternating surface structure is introduced into the material of the x-ray anode by means of an ablation method, in particular by means of laser ablation or electron beam ablation. In an alternative embodiment of the manufacturing method, the alternating surface structure is produced by way of an additive manufacturing method, in particular by way of selective laser melting, laser sintering, electron beam melting and/or by way of fused filament fabrication, gas dynamic cold spraying, screen printing or by means of a coating method, in particular by means of chemical vapor deposition or physical vapor deposition. In embodiments, the alternating surface structure can also be formed by any combination of the previously described methods. In particular, provision can be made to provide combinations of additive and subtractive methods.

FIG. 1 shows an x-ray emitter 100 embodied as a rotary piston emitter with a vacuum housing 4 mounted rotatably in bearings 8 within a housing 2. The housing 2 typically is or can be filled with a liquid coolant, in particular with a cooling oil, so that the coolant circulates directly around the vacuum housing 4 as it rotates during operation. The vacuum housing 4 can be made to rotate in a rotational movement about the axis of rotation R by way of a shaft 5, for instance.

One part of the vacuum housing 4 is formed by an x-ray anode 6 embodied in the shape of a plate, which has an edge-side region provided for impingement with electrons e. A high voltage is present between the x-ray anode 6 and a cathode 10, so that the cathode 10 emits electrons e during operation, which are accelerated in the direction of the x-ray anode 6. Here a deflection device 12, which comprises in particular a number of magnetic deflection coils, deflects the electrons e onto a suitable trajectory, so that in the region of the focal point B these strike the surface 14 of the x-ray anode 6.

The deflection device 12 is embodied as a magnetic dipole, for instance, and is arranged in the region of a narrowing 16 of the vacuum housing 4. Since the region between the narrowing 16 and the x-ray anode 6 is essentially field-free, in an embodiment of this type the electrons strike the surface 14 of the x-ray anode 6 at a relatively small angle of impact $\alpha$.

When the electrons e strike the x-ray anode 6, x-rays y are produced in a manner known per se. The x-ray beams y leave the housing 2 of the x-ray emitter 100 by way of an exit window 18. Further facilities for beam formation (not shown in detail) can be arranged downstream of the exit window 18, for instance a shutter box or a collimator.

The region of the surface 14 impinged upon by electrons e in the region of the focal point B has a surface structuring in the micrometer range. The surface structure 20 of the structured surface 14 is shown schematically in the drawings in FIGS. 2 to 4 which are not shown true to scale.

Figure 2:
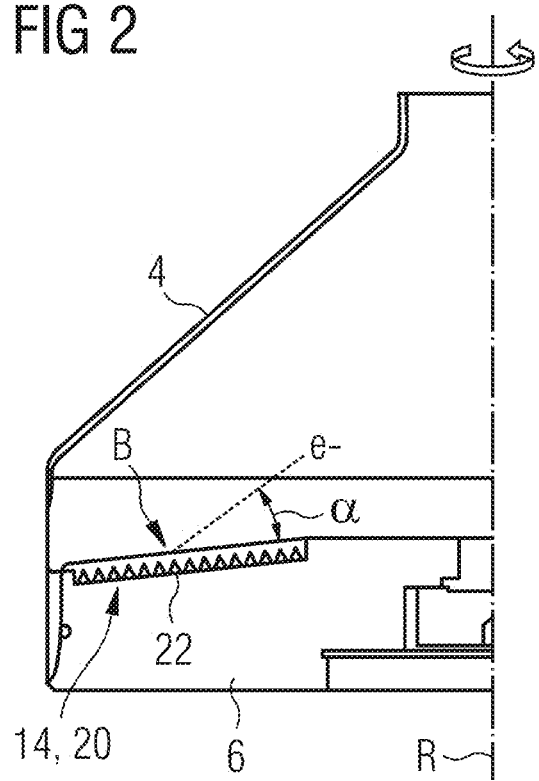

FIG. 2 shows the section of the vacuum housing 4 embodied in rotational symmetry with respect to the axis of rotation R across the narrowing 16. For improved illustration, the surface structure 20 is shown significantly enlarged. With a representation shown true to scale, the surface structure 20, which has a periodically alternating profile in the micrometer range, would not be visible.

Figure 3:
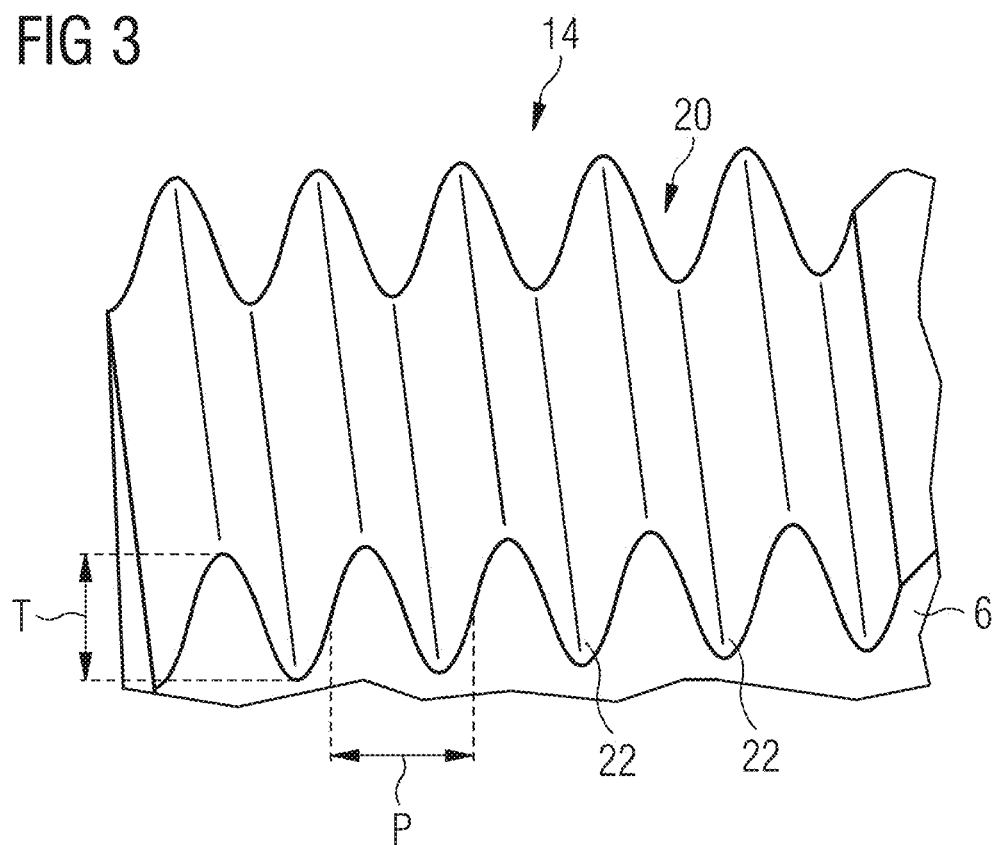
FIG. 3 a representation of a section of an x-ray anode with surface structuring and not true to scale.
Figure 4:
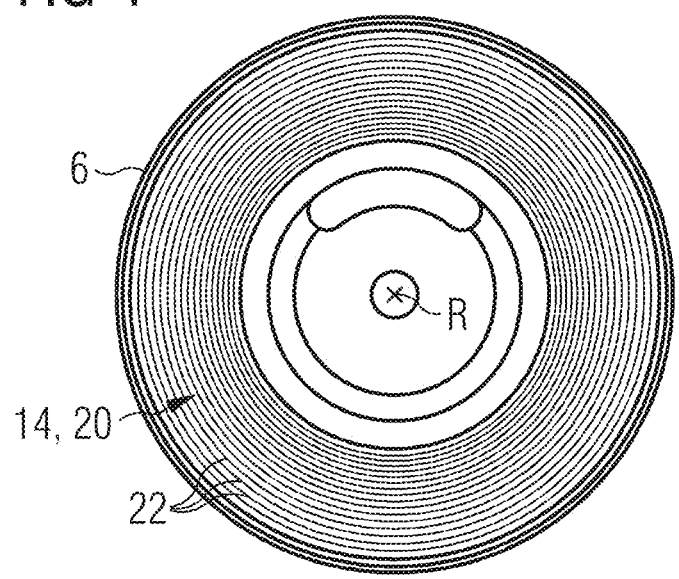
FIG. 4 a representation of the x-ray anode with surface structuring in a top view and not true to scale.

The periodically alternating surface structure 20 is moreover shown in detail in FIG. 3, not shown true to scale, and in the top view in FIG. 4, not shown true to scale.

In the embodiment shown by way of example in FIGS. 2 to 4, the periodically alternating surface structure 20 comprises a number of channels 22, which form a circumferential surface structuring in the edge-side region of the x-ray anode 6 as circles which are concentric to one another. For instance, the channels 22 are embodied like those on a vinyl record. In the top view (FIG. 4), the center point of the concentric, circular channels 22 coincides with the axis of rotation R.

In the cross-section, the surface structure 20 has an approximately sinusoidal profile (cf. FIG. 3) with a periodicity P and a depth extension T. Both the periodicity P (or: period length) and also the depth extension T is in the micrometer range. In the example embodiment only shown for illustration purposes and not to be regarded as restrictive, the ratio between the depth extension T and the periodicity is approximately 1:1. In particular, both the depth extension T and also the periodicity P are approximately 15 µm.

The portion of the scattered electrons e can be reduced in the direction of incidence with a structured x-ray anode 6 of this type, particularly with a flat electron incidence (cf. FIG. 2). This effect can advantageously be used in x-ray anodes 6 of different types, in other words in particular also with rotary anodes or stationary anodes. However this can be used particularly advantageously in rotary piston emitters in order to compensate for the intrinsic, i.e. design-related, disadvantage resulting from a flat angle of impact α of the electrons e with the associated high backscatter rate. The surface structure 20 of the x-ray anode 6 reduces in particular the portion of the scattered electrons e, which strikes the exit window 18 and therefore reduces the image quality-reducing extra focal radiation caused by scattered electrons e.

An increased voltage concentration is to be expected within the channels 22 or the depressions of the structured surface 14, which is caused by the thermal load of the x-ray anode 6 during operation of the x-ray emitter 100. It is useful to provide as large a curvature radius as possible within the channels 22 or depressions, in order to counteract a plastic deformation of the x-ray anode 6. It would be conceivable for stress cracks to form at these points, which however generally at least do not significantly influence the function of the channels 22. In particular, it can be assumed that cracks of this type would cause no or only a minimal reduction in the dose, at least compared with smooth anode surfaces, which in this respect may have signs of ageing.

Although the invention has been illustrated and described in detail by reference to the preferred example embodiment, the invention is not restricted thereby. Other variations and combinations can be derived therefrom by a person skilled in the art without departing from the essential concept of the invention. In particular, structured surfaces 14 in x-ray anodes 6 of different types can be provided to minimize the extra focal radiation and/or to increase the photon yield at the same power.

The patent claims of the application are formulation proposals without prejudice for obtaining more extensive patent protection. The applicant reserves the right to claim even further combinations of features previously disclosed only in the description and/or drawings.

References back that are used in dependent claims indicate the further embodiment of the subject matter of the main claim by way of the features of the respective dependent claim; they should not be understood as dispensing with obtaining independent protection of the subject matter for the combinations of features in the referred-back dependent claims. Furthermore, with regard to interpreting the claims, where a feature is concretized in more specific detail in a subordinate claim, it should be assumed that such a restriction is not present in the respective preceding claims.

Since the subject matter of the dependent claims in relation to the prior art on the priority date may form separate and independent inventions, the applicant reserves the right to make them the subject matter of independent claims or divisional declarations. They may furthermore also contain independent inventions which have a configuration that is independent of the subject matters of the preceding dependent claims.

None of the elements recited in the claims are intended to be a means-plus-function element within the meaning of 35 U.S.C. § 112(f) unless an element is expressly recited using the phrase "means for" or, in the case of a method claim, using the phrases "operation for" or "step for."

Example embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. An x-ray anode for an x-ray emitter, the x-ray anode comprising:
a structured surface provided for impingement with electrons, the structured surface including a surface structure that periodically alternates at least in sections and that has a varying depth extension, wherein
the varying depth extension and a periodicity of the surface structure are up to 40 µm, and
at least one of a variation of the varying depth extension or the periodicity is in a range of an average free electron path length in a material of the x-ray anode.

2. The x-ray anode of claim 1, wherein the surface structure includes channels running in parallel to one another at least in sections.

3. The x-ray anode of claim 2, wherein
the x-ray anode has a rotationally symmetrical design, and
the channels run obliquely to a radial direction determined by the rotationally symmetrical design.

4. The x-ray anode of claim 2, wherein
the x-ray anode has a circumferential form, and
the channels run obliquely to a radial direction determined by the circumferential form of the x-ray anode.

5. The x-ray anode of claim 2, wherein a ratio of the varying depth extension to the periodicity of the surface structure is about 1:1.

6. The x-ray anode of claim 1, wherein the surface structure includes circumferential, circular channels.

7. The x-ray anode of claim 6, wherein the circular channels are arranged concentrically with respect to one another.

8. The x-ray anode of claim 1, wherein a ratio of the varying depth extension to the periodicity of the surface structure is about 1:1.

9. The x-ray anode of claim 1, wherein the surface structure includes a substantially sinusoidal profile in cross-section, a substantially rectangular profile or a substantially sawtooth profile.

10. The x-ray anode of claim 1, wherein at least one of the varying depth extension or the periodicity of the surface structure is up to 30 µm.

11. The x-ray anode of claim 10, wherein at least one of the varying depth extension or the periodicity of the surface structure is up to 20 µm.

12. The x-ray anode of claim 11, wherein at least one of the varying depth extension or the periodicity of the surface structure is up to 15 µm.

13. The x-ray anode of claim 1, wherein the surface structure is introduced into the material of the x-ray anode by way of an ablation method.

14. The x-ray anode of claim 13, wherein the ablation method includes at least one of laser ablation, electron beam ablation, microstructure machining, micro die sinking or an etching method.

15. The x-ray anode of claim 1, wherein the surface structure is produced by way of an additive manufacturing method.

16. The x-ray anode of claim 15, wherein the additive manufacturing method includes at least one of selective laser melting, laser sintering, or electron beam melting.

17. The x-ray anode of claim 1, wherein the surface structure is produced by way of at least one of fused filament fabrication, gas dynamic cold spraying, screen printing, chemical vapor deposition or physical vapor deposition.

18. An x-ray emitter comprising:
the x-ray anode of claim 1.

19. The x-ray emitter of claim 18, wherein the x-ray anode is configured to rotate about an axis of rotation.

20. The x-ray emitter of claim 19, wherein the x-ray emitter is configured to receive a strike of electrons substantially at an angle of impact of up to 90°.

21. The x-ray emitter of claim 19, wherein the x-ray emitter is configured to receive a strike of electrons substantially at an angle of impact of at most about 45°.

22. The x-ray emitter of claim 18, wherein the x-ray emitter is structurally configured to receive a strike of electrons substantially at an angle of impact of up to 90°.

23. The x-ray emitter of claim 18, wherein the x-ray emitter is configured to receive a strike of electrons substantially at an angle of impact of at most about 45°.

24. The x-ray anode of claim 1, wherein
the surface structure has at least a first section and a second section,
the first section includes a plurality of first channels, and
a depth of the surface structure in the first section is different from a depth of the surface structure in the second section.

25. The x-ray anode of claim 24, wherein the second section includes a plurality of second channels.

26. The x-ray anode of claim 1, wherein the surface structure includes a plurality of channels, wherein a depth of at least two of the plurality of channels is different.

27. A method, comprising:
using an x-ray emitter to generate x-ray images, the x-ray emitter including an x-ray anode, the x-ray anode having a structured surface provided for impingement with electrons, the structured surface including a surface structure that periodically alternates at least in sections and that has a varying depth extension, wherein
the varying depth extension and a periodicity of the surface structure are up to 40 μm, and
at least one of a variation of the varying depth extension or the periodicity is in a range of an average free electron path length in a material of the x-ray anode.

28. A method for producing an x-ray anode including a structured surface provided for impingement with electrons, the structured surface including a surface structure that periodically alternates at least in sections and that has a varying depth extension, wherein the varying depth extension and a periodicity of the surface structure are up to 40 μm, and wherein at least one of a variation of the varying depth extension or the periodicity is in a range of an average free electron path length in a material of the x-ray anode, the method comprising:
introducing the surface structure into the material of the x-ray anode via an ablation method or via an additive manufacturing method.

29. The method of claim 28, wherein the ablation method includes laser ablation or electron beam ablation.

30. The method of claim 28, wherein the additive manufacturing method includes at least one of selective laser melting, laser sintering, electron beam melting, fused filament fabrication, gas dynamic cold spraying, screen printing, chemical vapor deposition or physical vapor deposition.

* * * * *